UNITED STATES PATENT OFFICE.

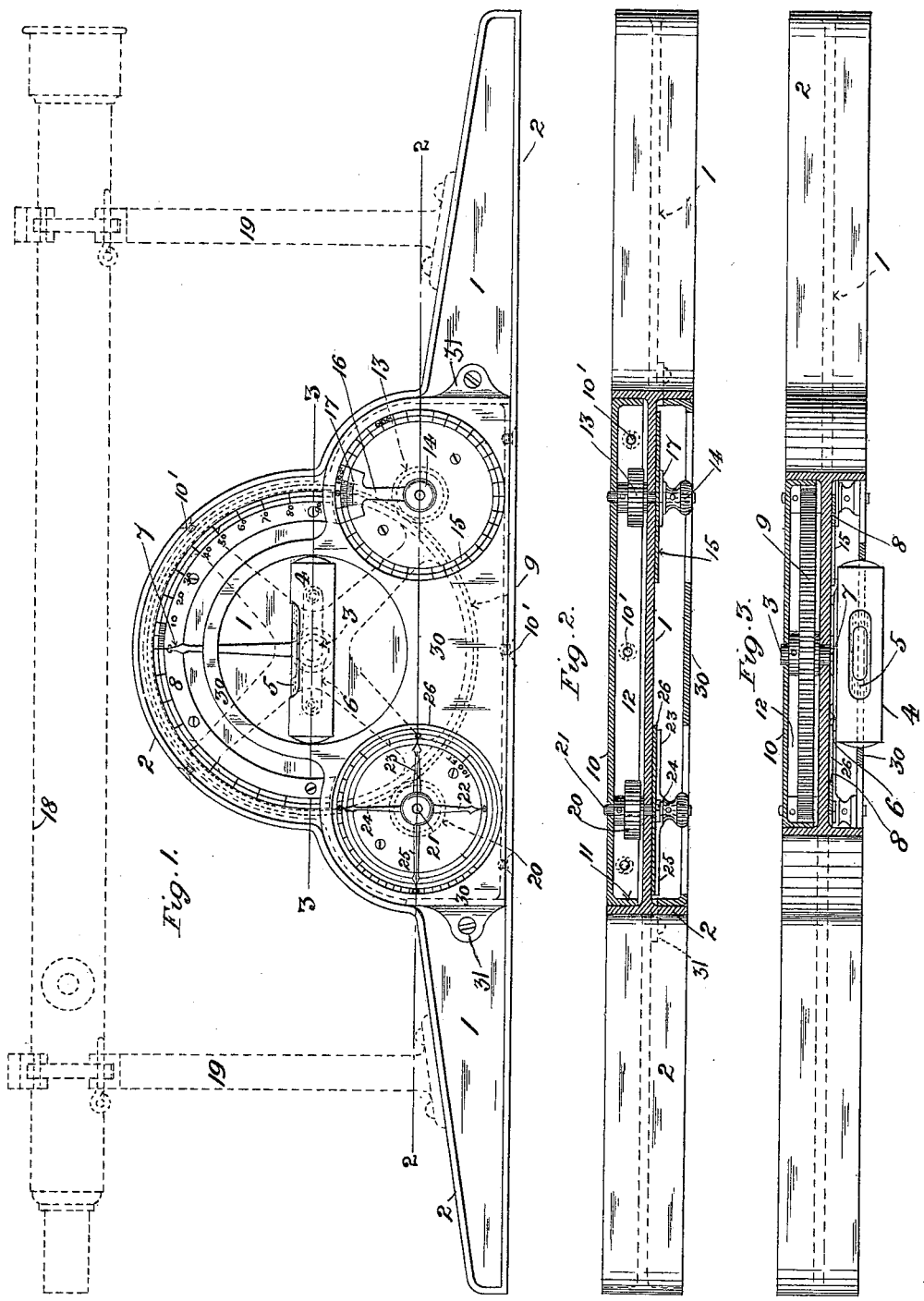

GOTTHOLD LANGER, OF ST. LOUIS, MISSOURI, ASSIGNOR OF ONE-HALF TO E. HENRY VORDTRIEDE, OF SAME PLACE.

COMBINED LEVEL AND ANGLE-MEASURING DEVICE.

SPECIFICATION forming part of Letters Patent No. 621,258, dated March 14, 1899.

Application filed December 13, 1898. Serial No. 699,155. (No model.)

*To all whom it may concern:*

Be it known that I, GOTTHOLD LANGER, a citizen of the United States, residing at St. Louis, State of Missouri, have invented certain new and useful Improvements in a Combined Level and Angle-Measuring Device, of which the following is a full, clear, and exact description, reference being had to the accompanying drawings, forming a part thereof.

My invention has relation to improvements in combined levels and angle-measuring devices; and it consists in the novel arrangement and combination of parts more fully set forth in the specification and pointed out in the claims.

In the drawings, Figure 1 is a front elevation of my device. Fig. 2 is a longitudinal section taken on line 2 2 of Fig. 1, and Fig. 3 is a similar section taken on line 3 3 of Fig. 1.

The object of my invention is to devise an instrument capable of measuring angles when used in connection with any of the prevailing forms of levels or transits or as an ordinary level and inclination-measure when used independently of such level or transit.

A further object is to provide the present device with means for ascertaining and reading distances in connection with any of the prevailing forms of leveling-rods, as will be fully explained by a detailed description of the invention, which is as follows:

Referring to the drawings, 1 represents a web or rib of any convenient contour, surrounded by an encompassing flange or ledge 2, projecting equally on each side of said rib. The ledge serves to house the several movable parts of the device. Mounted approximately at the center of the frame and passing through the rib is the spindle 3, carried by the casing 4 of the level-tube 5, the expanded base 6 of the spindle being secured directly to the casing. Projecting from the base of the spindle 3 is an arm or index 7, which coöperates with a scale on the limb or plate 8, secured to the front surface of the rib and graduated from zero to ninety degrees for each quadrant. Carried by the rearwardly-projecting portion of the spindle 3 is a gear-wheel 9, the latter being protected by a rear cover-plate 10, conforming to the contour of the frame and secured to the ledge 2 by means of screws 10', (shown dotted in Fig. 1,) passed, respectively, through the ledge and through the inwardly-projecting flange 11, with which the cover-plate is provided, the said flange passing on the inside of the ledge and the edge thereof resting against the rear surface of the rib. There is thus formed a rear chamber or pocket 12 between the rib and cover-plate 10 for the housing of the gear mechanism with which my present device is provided.

Meshing with the gear-wheel 9 is a pinion 13, mounted on the spindle of the milled head 14, said spindle passing through the center of a graduated circular plate 15, secured to the front face of the rib 1 and carrying an arm or index 16, coöperating with the scale of said plate. In the present device the relation of the diameters of the gear-wheel 9 and pinion 13 is as six is to one, so that the angular velocity of the free end of the arm 16 is six times that of a point on the arm 7 correspondingly removed from the axis of rotation of the spindle 3, by which it is carried. It follows, therefore, by reason of the multiplying-gear by which the arm 16 is connected to the arm 7 of the level that for the distance the level-arm 7 travels to describe, say, ten degrees on the limb 8 the corresponding distance traveled by the free end of the arm 16 can be divided into six spaces, each of said six spaces representing one-sixth of ten degrees of travel of the arm 7—that is to say, one hundred minutes. Thus for a given angle, which may be measured by the level-arm 7, the sweep of the arm 16 is magnified according to the proportions of the multiplying-gears used and the greater will be the facility of reading any angle which the arm 7 records. This is obvious, for by reason of the increased travel of the arm 16 the space thus traveled can be subdivided to better advantage. In the present case each of the one-hundred-minute divisions on the plate 15 is subdivided into ten-minute divisions. The vernier 17, carried by the arm 16 of the milled head 14, is graduated to read to single minutes. While the relation between the main gear-wheel and the pinion of the supplemental scale with which the plate 15 is provided is six to one, any other relation may subsist without departing from the nature of my invention.

The device thus far described may be used as a carpenter's level or a measure of angles in connection with the ordinary transit-telescope 18 (shown dotted in Fig. 1) and secured by arms 19 to the frame. When the instrument is perfectly level or horizontal, the arms or indices point to the zero-marks on their respective scales. When the instrument is dipped to a certain angle, the bubble of the level-tube of course shifts to one end of the level-tube, being restored to its center position within the tube by restoring the latter to its horizontal position. This is done by operating or turning the milled head 14 in proper direction until, through the medium of the gearing described, the level-tube is restored to a horizontal. The angle indicated by the pointers is the angle to which the instrument has been dipped. This can be read on either of the scales heretofore referred to.

Meshing also with the gear-wheel 9 at a point opposite the pinion 13 is a second and similar pinion 20, the spindle 21 of which carries in the present instance a series of radial arms 22 23 24 25, increasing progressively in length and adapted to coöperate with the division-marks or scales of a series of corresponding diametrically-increasing circles marked on a plate 26, secured to the rib. This second scale can be used as an inclination-measure for carpenters or as a measure of distances when used with an ordinary transit, as follows: As an inclination-measure the spindle 21 can be turned until any one of the arms 22 23 24 25 points to a certain division-mark, shifting the bubble from its center position in the tube. The carpenter then has simply to tilt the frame until the bubble is in the center of the tube, for which positions the surface of the piece of work operated on will conform to the angle to which the device has been set.

As a measure of distances the second supplemental scale may be used as follows: The inner or smallest circle can be divided into any number of arbitrary spaces. The number of spaces of each succeeding circle in the present case are just double those of the immediate smaller circle, the divisions being always made along arcs included between the continuation of the radii subtending any unit of division of the inner circle. The divisions are originally marked with the aid of a leveling-rod or other rod divided into equal spaces. Let us suppose the instrument to be set at zero—that is to say, the level is at zero—and the arms 22 23 24 25 each point to the zero of their respective circles. In this position let a leveling-rod be sighted at a distance (previously measured) of one hundred feet, the horizontal wire of the telescope of the transit covering the line of division between any two spaces on the rod. Let the instrument be now tilted so as to bring the horizontal wire opposite the next succeeding line of division on the rod. When this is done, we note the arc which has been described by the shortest arm 22 for the angle thus subtended (by reason of the tilting of the instrument for said space on the rod) and mark the one-hundred-foot division-mark on said inner circle. The instrument thus becomes set for reading one hundred feet or any multiple thereof. For example, let us suppose the instrument is again set at zero and the rod is carried to a distance which we wish to calculate. We direct the horizontal wire of the cross-hair of the telescope to cover any line of division on the rod and then tilt the instrument to an angle sufficient to subtend a full space or division. We then note the position of any of the arms 22 23 24 25. Suppose the arm 22 instead of traveling the full length of the one-hundred-foot arc of the inner circle had moved only one-eighth of the arc, (a fact fully and accurately indicated by the arm 25, which under the circumstances would come opposite the end of the first of the eight divisions into which the arc through which it travels is divided,) then inasmuch as the angle subtended decreases mathematically in proportion as the distance increases it follows that the distance of the rod is eight times one hundred feet or eight hundred feet distant. Of course the same result could be accomplished by dividing the unit of division (one-hundred-foot division) of the inner circle into eight parts. Then if the arm 22 moved only the distance of one of said parts it would indicate that the rod was eight times as far distant as it would be were the arm to move the full length of the arc thus divided. The arc could of course be divided into ten or twenty parts, in the latter case the instrument reading to two thousand feet. The object of spacing the inner divisions along circles increasing diametrically is to avoid crowding the minor divisions into a small space, and thus facilitating the reading of the instrument.

While one main limb and only two supplemental scales are herein shown, it is obvious that the principle can be carried to any number of such scales and that minor changes may be made in the device without departing from the spirit of the invention. The larger angles can of course be read on the main limb. The smaller readings can be read on the right-hand supplemental scale. Distances can be recorded by the left-hand supplemental scale. It is apparent that by means of the present device distances can be read with levels or transits whose telescopes are not provided with the usual parallel wires or hair by which the divisions on the leveling-rods are subtended and distances read.

The level and index arms are preferably protected by a front cover-plate 30, cut away in such portions as may be necessary to uncover the scales and allow for the free oscillation of the level-tube. The cover is secured by arms 31, screwed directly to the web 1.

Having described my invention, what I claim is—

1. In a level, a suitable frame comprising a web and a circumscribing ledge projecting over or beyond each face thereof a suitable distance to protect the movable parts of the device, a level having a spindle, mounted in the web, said spindle projecting through the web, a gear-wheel carried by said rear projecting end of the spindle and protected by said ledge, a graduated limb on the front face of the web, an index-arm carried by the level and coöperating with said limb, a second spindle carried by the web, a pinion mounted on said spindle and meshing with the gear-wheel, a supplemental scale, an arm connected to said second spindle and coöperating with said second scale, a unit division of the scale on the main limb being indicated on the supplemental scale by a series of divisions numerically increased in the proportion as the diameter of the pinion is contained in the diameter of the gear-wheel, the parts operating substantially as and for the purpose set forth.

2. In a level, a suitable frame comprising a flat web and circumscribing ledge projecting over or beyond each face thereof a suitable distance to protect the movable parts of the device, a level having a spindle mounted in the web, a rear cover-plate carried by the frame and forming a pocket or chamber with the wall of the web, the spindle of the level projecting into said pocket, a gear-wheel carried by the spindle, a graduated limb secured to the front face of the web, an index carried by the level and coöperating with said limb, a second spindle carried by the web, a pinion mounted on the said spindle within the pocket, and meshing with the gear-wheel, a supplemental scale, an arm connected to the said spindle and coöperating with said second scale, a milled head for said second spindle for operating the same, a unit division of the scale on the main limb being indicated on the supplemental scale by a series of divisions numerically increased in the proportion as the diameter of the pinion is contained in the diameter of the gear-wheel and a vernier carried by the arm of the second spindle, the parts operating substantially as and for the purpose set forth.

3. In a level, a suitable frame comprising a web and a circumscribing ledge projecting over or beyond each face thereof a suitable distance to protect the movable parts of the device, a level having a spindle, mounted in the web, said spindle projecting through the web, a gear-wheel carried by said rear projecting end of the spindle and protected by said ledge, a graduated limb on the front face of the web, an index-arm carried by the level and coöperating with said limb, a second spindle carried by the web, a pinion mounted on said spindle and meshing with the gear-wheel, a second supplemental scale, an arm connected to said second spindle and coöperating with said second scale, a unit division of the scale on the main limb being indicated on the supplemental scale by a series of divisions numerically increased in the proportion as the diameter of the pinion is contained in the diameter of the gear-wheel, a third supplemental scale, an arm or arms therefor, similar intermediate speed-multiplying gearing between the first and third index-arms, the parts operating substantially as, and for the purpose set forth.

4. In a level, a suitable frame comprising a flat web and a circumscribing ledge projecting over or beyond each face thereof a suitable distance to protect the movable parts of the device, a level pivotally mounted on the web along one face thereof within the confines of the ledge, suitable scales and index-arms in connection with the level also located along the same face of the web, and intermediate gearing mounted on the opposite face of the web within the confines or limits of the ledge, said gearing serving to connect the index-arms of the said scales with the axis of the level, substantially as set forth.

In testimony whereof I affix my signature in presence of two witnesses.

GOTTHOLD LANGER.

Witnesses:
EMIL STAREK,
JAMES J. O'DONOHOE.